United States Patent [19]

Byerley

[11] Patent Number: 5,047,108
[45] Date of Patent: Sep. 10, 1991

[54] TIRE BUILDING DRUM FOR FABRICATING HIGH PROFILE TYPE TIRE CARCASSES

[75] Inventor: Mark S. Byerley, Greenback, Tenn.

[73] Assignee: WYKO, Inc., Greenback, Tenn.

[21] Appl. No.: 491,353

[22] Filed: Mar. 9, 1990

[51] Int. Cl.[5] .................................. B29D 30/24
[52] U.S. Cl. .......................................... 156/417
[58] Field of Search ........................... 156/414–420

[56] References Cited

U.S. PATENT DOCUMENTS

| Re. 22,369 | 8/1943 | Bostwick . | |
|---|---|---|---|
| 2,168,897 | 8/1939 | Bostwick . | |
| 2,201,469 | 5/1940 | Bostwick . | |
| 2,335,169 | 11/1943 | Bostwick . | |
| 2,353,767 | 7/1944 | Schnedarek . | |
| 2,699,198 | 1/1955 | Balzhiser . | |
| 2,715,932 | 8/1955 | Frazier . | |
| 3,375,154 | 3/1968 | Ruttenberg et al. | 156/418 |
| 3,405,023 | 10/1968 | Eckenwiler et al. | 156/415 |
| 3,408,244 | 10/1968 | Frazier | 156/403 |
| 3,787,262 | 1/1974 | Appleby et al. | 156/123 |
| 3,867,229 | 2/1975 | Marra | 156/417 |
| 3,873,398 | 3/1975 | Yokoo et al. | 156/417 |
| 3,929,546 | 12/1975 | Katagiri et al. | 156/417 |
| 4,126,507 | 11/1978 | Kim et al. | 156/415 |
| 4,149,927 | 4/1979 | Lauer, Jr. | 156/415 |
| 4,151,035 | 4/1979 | Jellison | 156/415 |
| 4,220,494 | 9/1980 | Kawaida et al. | 156/415 |
| 4,292,112 | 9/1981 | Kumagai | 156/415 |
| 4,392,899 | 7/1983 | Bertoldo | 156/127 |
| 4,425,180 | 1/1984 | Samokhvalov et al. | 156/417 |
| 4,436,574 | 3/1984 | Long et al. | 156/415 |
| 4,445,962 | 5/1984 | Felder | 156/398 |
| 4,636,277 | 1/1987 | Owen et al. | 156/417 |
| 4,780,171 | 10/1988 | Byerley | 156/417 |

FOREIGN PATENT DOCUMENTS

| 692927 | 8/1964 | Canada . | |
| 181268 | 4/1966 | U.S.S.R. | 156/417 |
| 1130732 | 10/1968 | United Kingdom . | |
| 2153758 | 8/1985 | United Kingdom . | |

Primary Examiner—Geoffrey L. Knable
Attorney, Agent, or Firm—Luedeka, Hodges, Neely & Graham

[57] ABSTRACT

The invention is directed to radially collapsible tire building drum assembly which is provided with heavy undercut bead assemblies for the fabrication of tire carcasses, particularly those of multiple bead construction as utilized in high profile tires such as required for heavy trucks, earth movers, and aircraft. The foldable bead ring assembly of the present invention is provided with a plurality of circumferential or arcuate ring segments each supported by a drum segment. In the preferred embodiment, alternately disposed ring segments are provided with pivotable end sections which are pivoted out of the way during the drum collapsing operation to provide recesses for receiving outer end portions of adjacent ring segments. Simultaneously, with this reception of the outer end portions of the adjacent ring segments in the recesses the pivoted end sections are received in receptacles behind the adjacent bead ring segments. This intermeshing or folding of the ring segments during the radial collapse of the drum enables the drum to be radially displaced into a fully collapsed state while retaining the bead rings fixedly attached to the drum assembly.

18 Claims, 5 Drawing Sheets

TIRE BUILDING DRUM FOR FABRICATING HIGH PROFILE TYPE TIRE CARCASSES

BACKGROUND OF THE INVENTION

The present invention relates generally to collapsible drums for building or fabricating multiple-ply tire carcasses, and more particularly to such drums for use in the fabrication of carcasses for the manufacture of high profile tires, especially of the multiple bead variety.

Collapsible tire building drums which have been found to be particularly suitable for the assembly of tire carcasses thereon are of the radially collapsible type. These collapsible drums are rotatable about a central axis and are usually formed of a plurality of elongated, axially extending arcuate drum segments which are coupled to a central hub arrangement by a pivotable linkage mechanism. The hub arrangement and the linkage mechanism coact with the drum segments to provide an essentially uninterrupted cylindrical surface for the assembly of the tire carcass and, thereafter, the collapse of the drum by the displacement of the drum segments towards the rotational axis so that the assembled tire carcass can be removed from the drum.

Tire carcasses assembled on collapsible drums and used for the manufacture of pneumatic tires normally include tire components such as multiple plies of tire bands, yarns, and one or more annular wire tire beads at opposite ends of the tire bands. Tire carcasses used for the manufacture of low profile tires e.g. highway type tires, usually have only a single wire bead at each end of the carcass and also provide a relatively small difference in bead diameter to carcass diameter on the tire building drum. Thus, the beads at opposite ends of the tire carcass, are of a diameter sufficiently close to that of the carcass on the drum so that the drum can be adequately collapsed to permit removal of the tire carcass from the collapsed drum. On the other hand, in the assembly of tire carcasses used for the manufacture of tires of the high profile type, such as off road, heavy truck, aircraft, and other multiple-bead tires, there is a relatively large difference in the ratio of the carcass diameter on the drum to the bead diameter. To fabricate such tire carcasses with previously known equipment, the collapsible drum was usually provided with radially inwardly extending tire bead rings to provide the relatively deep under cut bead flanges required for seating the wire beads, especially multiple-beads, at opposite ends of the tire carcass. The use of these tire bead rings inhibits the bead-bearing ends of the assembled tire carcass from rolling over to, in effect, seek the diameter of the tire carcass and also inhibits delaminations from occurring between the tire bands and the multiple beads. However, the presence of these bead rings have prevented the drum from being collapsed to a diameter sufficiently small to permit the removal of the tire carcass from the drum. To overcome this difficulty, tire bead rings were previously formed of a plurality of discrete arcuate ring segments which were removably supported on the drum so that upon completion of the tire carcass assembly, the bead ring segments could be individually detached from the drum and removed by hand so that the drum could be collapsed to a diameter sufficiently small to permit removal of the assembled tire carcass from the drum. These previous practices were found to be time consuming, extremely hazardous, and relatively expensive so as to considerably detract from the manufacture of high profile tires.

SUMMARY OF THE INVENTION

It is an object of the present invention to provide a collapsible tire carcass building drum with a folding bead ring arrangement for the fabrication of tire carcasses having relatively large differences in the diameter of the tire carcasses to the diameter of the bead or beads such as found in the manufacture of multiple bead-containing, high profile tires, whereby the aforementioned and other problems associated with the fabrication of such tire carcasses are obviated or substantially negated. Generally, in accordance with the present invention, the collapsible drum is fitted with foldable tire bead rings which are constructed in such a manner and cooperate with the collapsing drum segments so as to remain fixed to the drum segments during the collapse of the drum to a diameter sufficiently small to permit the removal of the assembled tire carcass. To achieve this objective, the tire building drum arrangement of the present invention generally comprises segmented sleeve means rotatable about an axis of rotation. Elongated cylindrical drum means are circumferentially disposed about the sleeve means and comprise a plurality of elongated axially extending arcuate drum segments. Collapsible means are coupled to each of the drum segments and to the hub means for collapsing the drum segments towards the rotational axis or for expanding the drum segments away from the axis to define the cylindrical drum means. Bead seating rings are supported at opposite longitudinal ends of the drum segments and project radially inwardly from the drum segments toward the rotational axis. The bead seating rings each comprises a plurality of curved or circumferential segments disposed end-to-end in a contiguous manner with each ring segment being attached to a drum segment. Alternately disposed ring segments are provided at opposite circumferential ends thereof with pivotably attached end portions which are radially pivoted for defining recess means in the ring segments. These recess means are adapted to receive outer end portions of the ring segments intermediate the alternately disposed ring segments during the collapse of the drum segments towards the rotational axis. Also, the ring segments disposed intermediate the alternately disposed ring segments are each provided with receptacle means therein for receiving the pivotably attached end portions of the alternately disposed ring segments during the collapsing of the drum segments towards the axis.

The utilization of the pivotable end portions to provide recesses in the alternately disposed ring segments, and the provision of the receptacles in the ring segments between or intermediate the alternately disposed ring segments together enable portions of the ring segments representing a considerable circumferential length of the bead ring to be merged or folded into the adjoining ring segments during the collapse of the drum so as to provide for drum collapse to a diameter required for the removal of the assembled tire carcass therefrom.

Tab means are attached to each of the pivotably attached end portions and extend into the receptacle means in the adjacent ring segment where the tab means are contacted by a portion of the ring segment during the radially inward displacement thereof to pivotably move the pivotable end portion radially inwardly to define the recess means. Also, bias means are in registry with each pivotably attached end portion for continually urging the latter radially outwardly from the axis to inhibit the end portion from excessive pivoting upon contact of the tab means by the adjacent ring segment as well as to help return the pivotably attached end portions to a location contiguous to the remainder of the ring segment when the drum segments are being expanded to define the tire building drum. The recess means and the receptacle means are each of a sufficient size to respectively contain outer end portions of the drum and ring segments intermediate the alternately disposed ring segments and to receive the pivoted end portions as the drum is being collapsed.

Another object of the present invention is to provide a collapsible drum assembly with securely attached, foldable bead rings having a heavily undercut profile particularly suitable for building multiple-bead tire carcasses used in the manufacture of tires such as required for heavy duty trucks, earth movers, aircraft, and the like.

A further object of the present invention is to provide a radially collapsible tire building drum assembly with folding tire bead-supporting rings which provide for drum segment movement capable of yielding, in a automatic manner, a higher ratio of drum collapse than previously available.

A still further object of the present invention is to provide a radially collapsible tire building drum assembly with folding bead ring segments which remain fixed to the drum during the radial collapse and expansion thereof so as to provide a significant increase in safety over the previously used drum assemblies requiring removable bead components for drum collapsing purposes.

A still further object of the present invention is to provide on a radially collapsible tire building drum with a deep bead ring arrangement which possesses no parts that are required to be removed for drum collapsing purposes so as to significantly reduce tire carcass building costs and maintenance, increase tire carcass uniformity due to the carcass building surfaces remaining intact through repeated tire building operations, and substantially reduce operator time and effort.

Other and further objects of the present invention will become obvious upon an understanding of the illustrative embodiment about to be described or will be indicated in the appended claims, and various advantages not referred to herein will occur to one skilled in the art upon employment of the invention in practice.

A preferred embodiment of the invention has been chosen for the purpose of illustration and description. The preferred embodiment illustrated is not intended to be exhaustive nor to limit the invention to the precise form shown. The preferred embodiment is chosen and described in order to best explain the principles of the invention and their application and practical use to thereby enable others skilled in the art to best utilize the invention in various embodiments and modifications as are best adapted to the particular use contemplated.

DETAILED DESCRIPTION OF THE INVENTION

Figure 1:
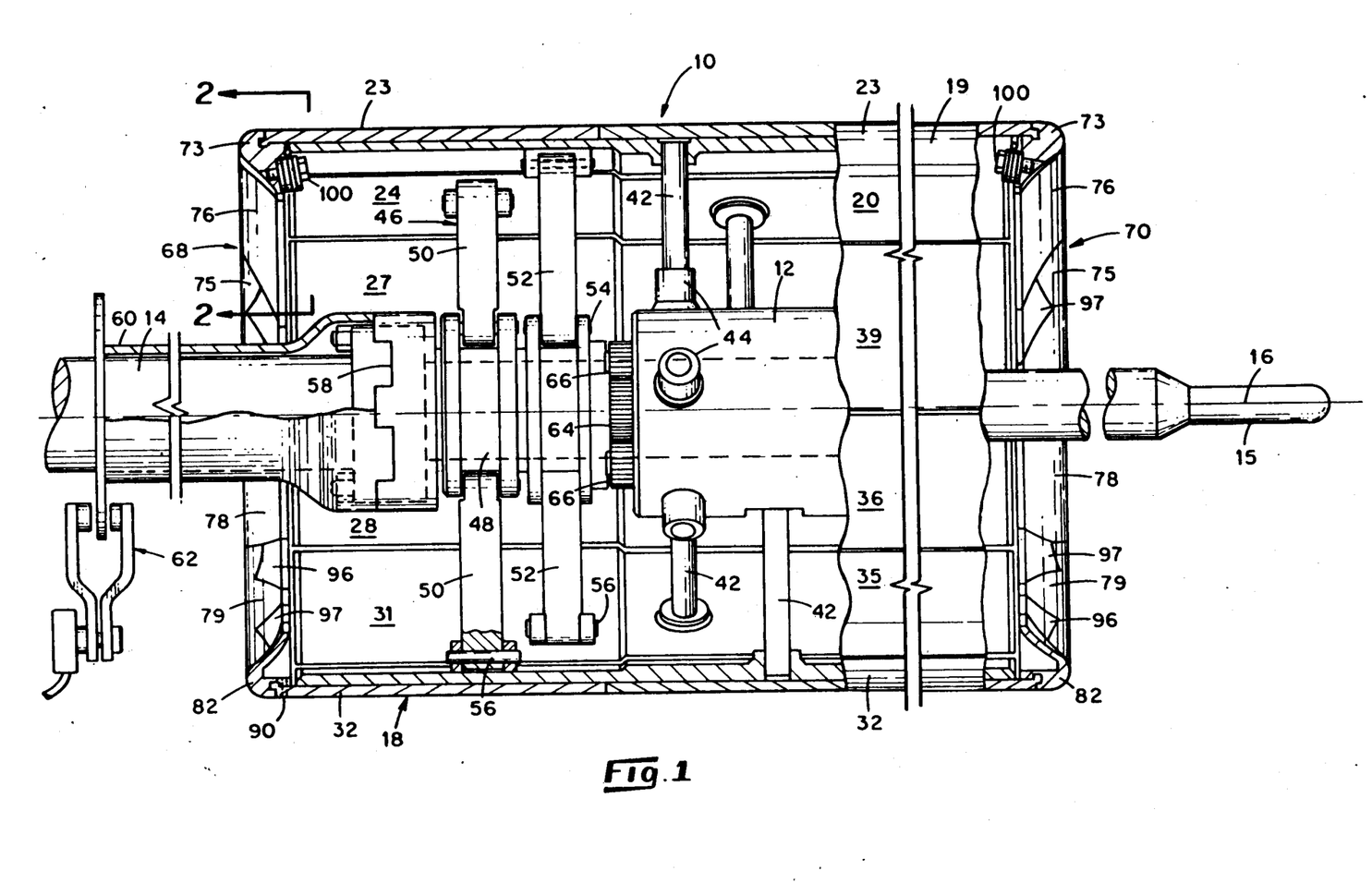
FIG. 1 is a sectional elevational view of a radially collapsible tire building drum assembly containing the folding tire bead arrangement of the present invention.

With reference to the accompanying drawings, particularly FIG. 1, the radially collapsible drum assembly with the foldable bead ring arrangement of the present invention is generally illustrated at 10. This radially collapsible drum assembly is constructed and adapted to operate in a manner substantially similar to that of the radially collapsible drum arrangement described in assignee's U.S. Pat. No. 4,636,277, which issued Jan. 13, 1987. This patent is incorporated herein by reference.

The collapsible tire building drum 10 comprises an elongated cylindrical central hub 12 affixed to and disposed about a drive shaft 14 having a conventional probe 15 at a distal end thereof and which is rotatable about a longitudinal axis 16. A plurality of elongated axially extending arcuate drum segments 18 are coaxially disposed about the hub 12 in a side-by-side relationship to form a cylindrical drum 19 upon which tire carcasses can be fabricated. The drum segments 18, as best shown in FIG. 1 and 5-7, are ten in number as indicated by numerals 20, 23, 24, 27, 28, 31, 32, 35, 36, and 39. These drum segments are individually attached to the hub 12 by similarly constructed, radially extending pillars 42 which are reciprocatively mounted in bushings 44 fixed to the outer surface of the hub 12.

Between the hub 12 and each end of the cylindrical drum 19 are drum collapsing mechanisms (one shown at 46) which are utilized to both collapse the drum segments 18 radially inwardly to permit removal of an assembled tire carcass from the drum and to expand the drum segments 18 radially outwardly to form an essentially unbroken cylindrical tire building drum 19.

Inasmuch as the collapsible mechanisms at both ends of the drum 19 are constructed substantially similar to one another, only one collapsible mechanism 46 is shown for the purposes of illustration and description. By using two collapsible mechanisms with the centrally located pillars 42 mounted on the hub 12, a relatively long tire building drum is provided for the manufacture of relatively large tire carcasses. Of course, if a shorter drum is desired, a single collapsible mechanism such as described in the aforementioned U.S. Pat. No. 4,636,277 may be readily utilized.

The collapsible mechanism 46 comprises an elongated sleeve 48 disposed about and rotatable on the shaft 14 at a location adjacent to the centrally located hub 12. To this sleeve 48 are coupled a plurality of swing arms or links 50 and 52 which radially extend to and are coupled one to each of the drum segments. As shown, the swing arms 50 are coupled to the even-numbered drum segments while the swing arms 52 are coupled to the odd-numbered drum segments for radially collapsing the drum segments in a specific sequence as will be described in detail below. The swing arms 50 and 52 are pivotably attached to the sleeve 48 and at individual drum segments by wrist pin-type arrangements 54 and 56, respectively.

In order to effect the radial collapse of the drum 19, every other drum segment or the alternately disposed even-numbered drum segments, as shown, is initially started radially inwardly prior to the collapse of the odd-numbered drum segments. Alternatively, during expansion of the drum segments to provide the drum building configuration the odd-numbered drum segments are radially displaced to the drum diameter immediately prior to the even-numbered drum segments. This selective collapsing and radial displacement of the drum segments is achieved by positioning the pivot points of the swing arms 50 on the sleeves at a location off center and the swing arms 52 on center as is described and shown in aforementioned U.S. Pat. No. 4,636,277.

To effect the simultaneous operation of the collapsible mechanisms 46 at both ends of the drum, the sleeve 48 is coupled through a suitable dog gear arrangement 58 to a quill or tube 60 which is rotatably disposed about the drive shaft 14. The quill 60 is, in turn, coupled at the end remote thereof to the dog gear arrangement 58 to a suitable brake mechanism, such as a disk brake arrangement generally shown at 62. With the drum fully expanded as in the tire building configuration, the rotation of the hub 12 by the drive shaft 14 rotates the drum through the drive link provided by the pillars 42. This rotation of the drum also rotates the sleeve 48 and the quill 60 via the linkage provided by the collapsible mechanism 46. When it is desired to collapse the drum for removal of a tire carcass thereon (not shown) the disk brake 62 is engaged to stop the rotation of the quill 60 and sleeve 48 while the drum segments 18 are rotated in a first direction at a relatively slow speed by the drive shaft 14, hub 12, and pillars 42. This stopping of the sleeve 48 while the drum is rotating causes the swing arms 50 and 52 to pivot at the sleeve 48 and sequentially pull the drum segments 18 radially inwardly to collapse the drum. Conversely, rotation of drum in the opposite direction with the brake 62 engaged causes the swing arms 50 and 52 to pivot in the opposite direction and sequentially expand the drum segments 18 to the tire building drum configuration.

As indicated above, the collapsible mechanism at the other end of the drum is separated from the illustrated collapsible mechanism 46 by the hub assembly. This collapsible mechanism is mechanically coupled to the sleeve 48 through a drive gear 64 attached to sleeve 48 at a location between the sleeve 48 and the hub 12. Spur gears 66 and jack shafts (not shown) connected thereto extend through the hub and are coupled to spur gears meshing with a driven gear attached to the sleeve in the second collapsible assembly (not shown). Thus, as the rotation of sleeve 48 is stopped through the braking of the quill 60, the rotation of the sleeve in the second collapsible assembly is also stopped to effect the simultaneous collapse or expansion of the tire building drum segments.

Figure 7:
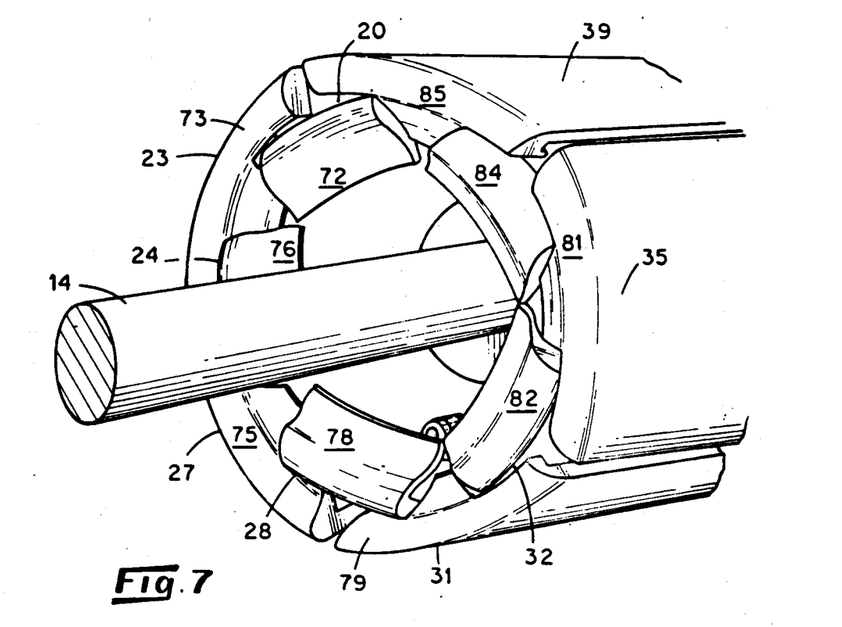
FIG. 7 is a still further perspective view showing the positional relationship of the foldable tire bead ring segments to one another when the tire building drum is in a collapsed state as required for removal of the assembled tire carcass.

As shown in the drawings, the even-numbered drum segments are of similar arcuate or circumferential lengths as are the odd-numbered drum segments. As illustrated, the odd-numbered drum segments have an outer circumferential or arcuate length greater than that of even-numbered drum segments. The particular circumferential lengths of the even- and odd-numbered drum segments are preselected so that the radially innermost ends of the even-numbered drum segments will be disposed closely adjacent to one another in an end-to-end relationship when the drum is in the collapsed configuration, as best illustrated in FIG. 7.

In accordance with the present invention, the aforementioned described tire building drum 10, when used to fabricate tire carcasses, especially the high profile, multiple, i.e., two or three, bead-type tires carcasses used for the fabrication of tires required for heavy vehicles such as trucks, earth movers, and aircraft, is provided with heavy, radially inwardly extending undercut shoulder forming and wire bead seating rings at opposite longitudinal ends of the drum 19, as generally shown at 68 and 70. These bead seating rings 68 and 70 are fixedly attached to the drum segments and are circumferentially segmented so that the outermost surface of each ring segment is of a circumferential length corresponding to that of the drum segment to which it is attached. As shown, the evenly numbered bead ring segments 72, 76, 78, 82, and 84 are attached to the even-numbered drum segments while the odd-numbered bead ring segments 73, 75, 79, 81, and 85 are attached to the odd-numbered drum segments. These bead ring segments are each securely fastened to the end of the drum segments by employing a suitable tongue-and-groove arrangement 88 and bolts 90 which extend through each of the drum segments into the underlying ring segments.

Figure 2:
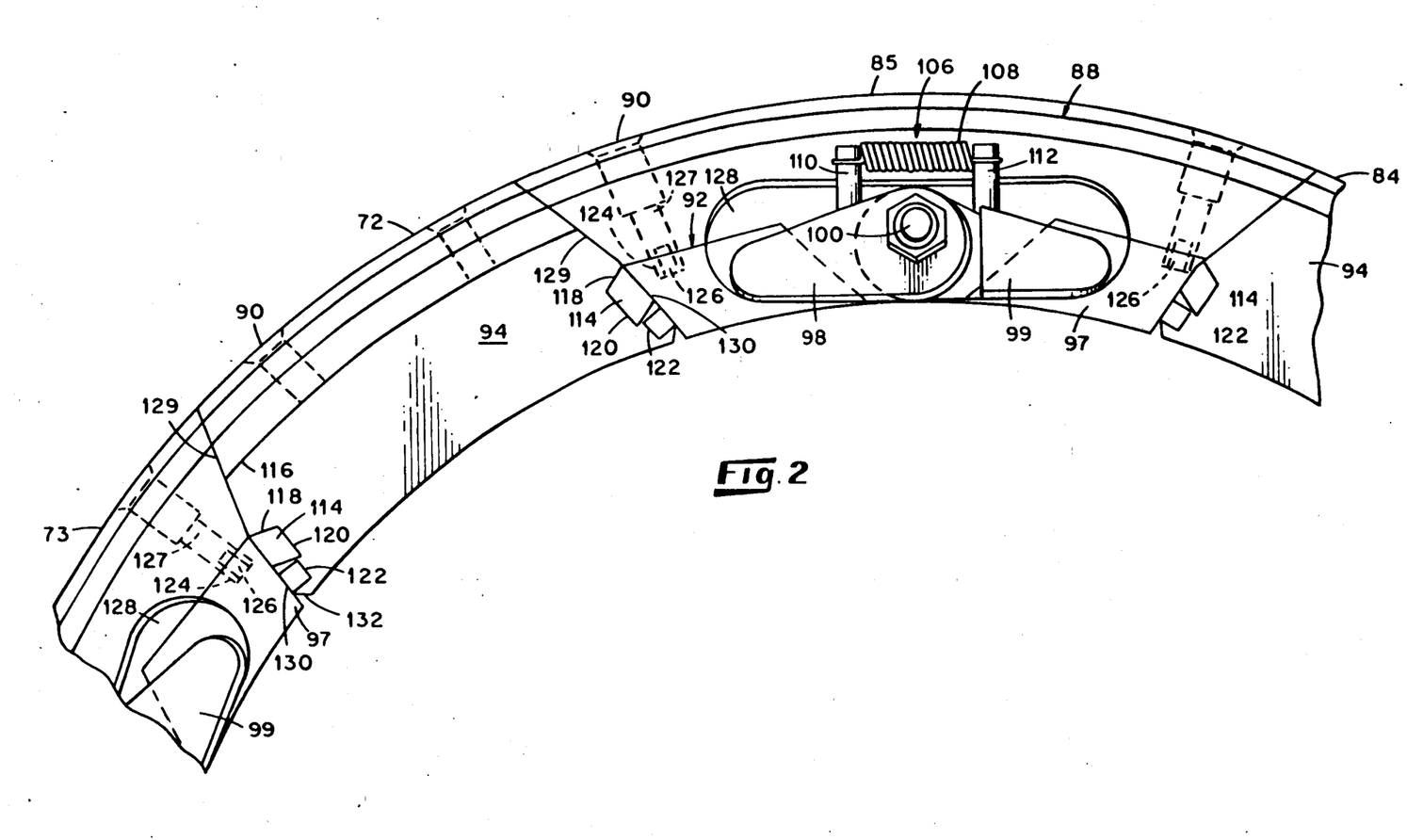
FIG. 2 is a fragmentary end view generally taken along lines 2—2 of FIG. 1 for illustrating further details of the folding tire bead arrangement of the present invention.
Figure 3:
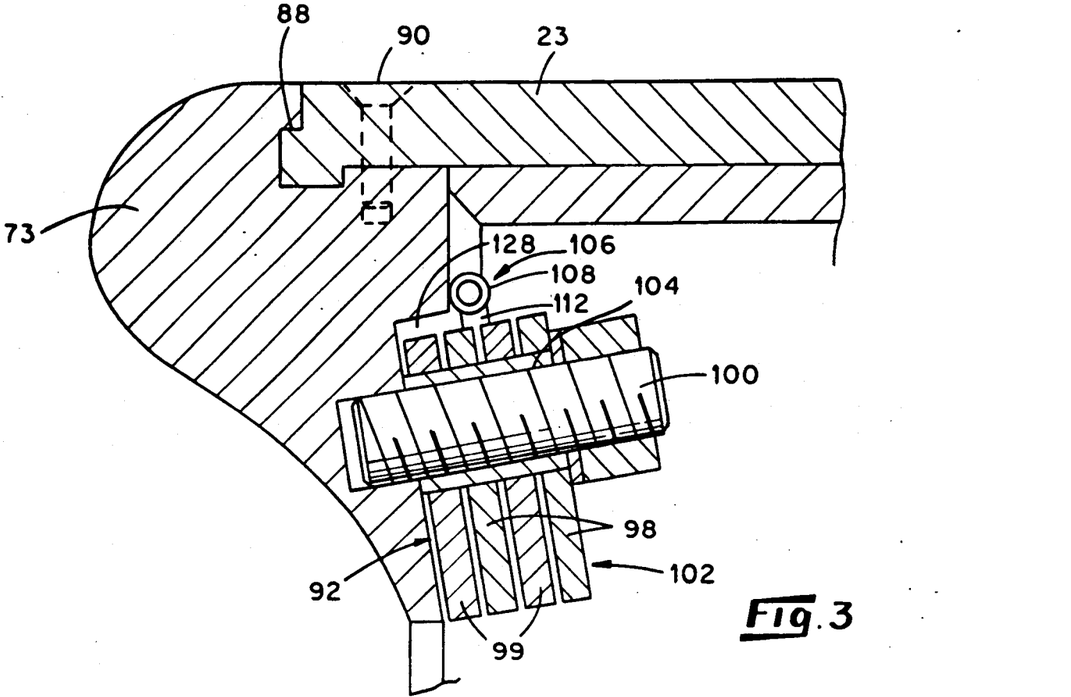
FIG. 3 is a sectional side view showing details of a tire bead ring segment used for supporting pivotable ring portions that provide recesses utilized for receiving end portions of adjacent bead ring segments during drum collapse.
Figure 4:
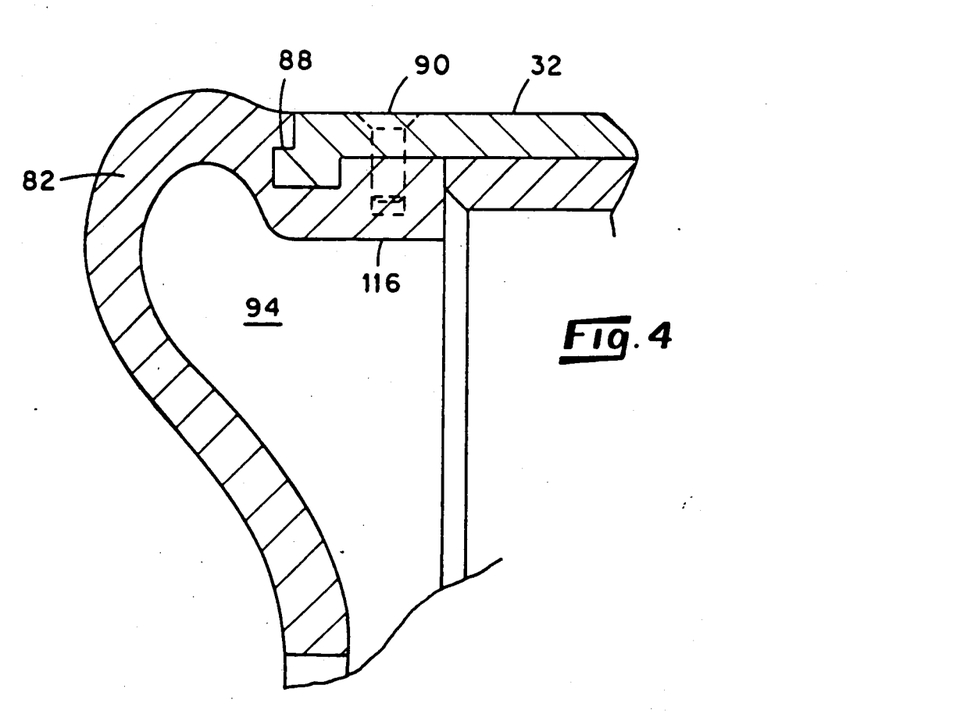
FIG. 4 is another sectional view showing a side view of a ring segment which is positioned intermediate a pair of ring segments as illustrated in FIG. 3 and which has receptacle means therein for receiving the pivotable end portions of the FIG. 3 ring segments during drum collapse.
Figure 5:
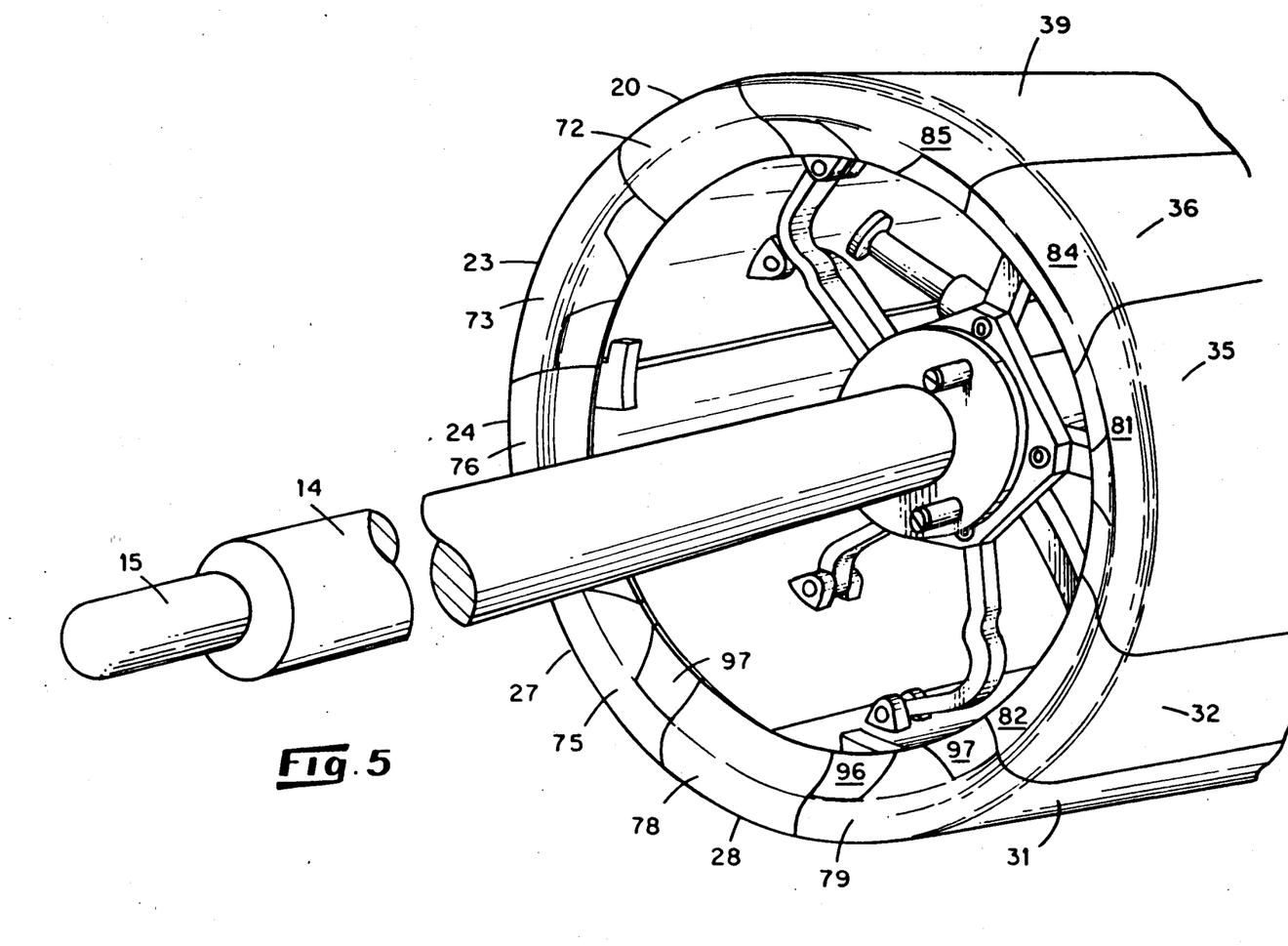
FIG. 5 is a perspective end view of the collapsible tire building drum assembly embodying the folding bead ring arrangement of the present invention and illustrating the drum in a fully expanded, tire carcass building configuration.
Figure 6:
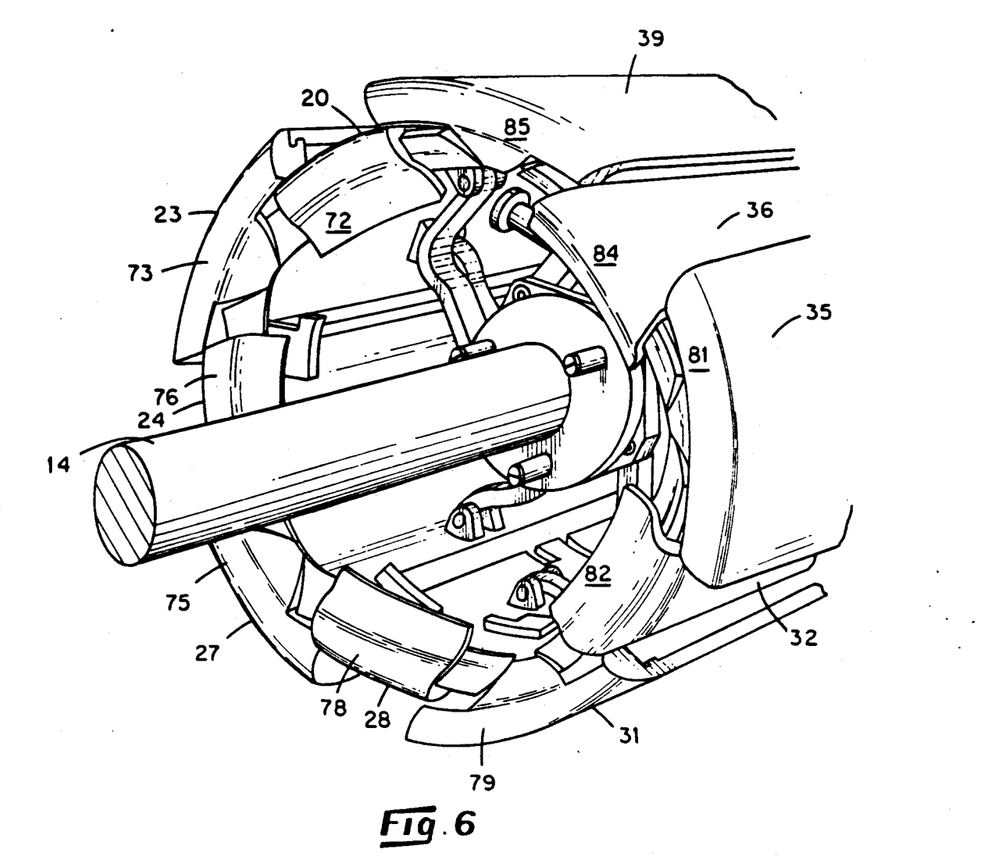
FIG. 6 is another perspective view substantially similar to that in FIG. 5 but showing the cooperative relationship of the drum segments and the foldable tire bead rings during collapse of the tire building drum.

As best shown in FIG. 2-4, the adjacently disposed ring segments are constructed differently from one another in order to provide for the collapse and expansion of the drum while all the ring segments remain attached to the drum segments. Each odd-numbered ring segment, i.e., every other segment, is of an essentially solid metal construction throughout its axial length and is provided with a pivotable or hinged door arrangement for forming recesses 92 in the ring segment at both ends thereof for receiving circumferentially outermost end portions of the adjacently disposed even-numbered drum and ring segments during the radial collapse of the drum. Each even-numbered ring segment is provided with a receptacle 94 open at both circumferential ends of the ring segment for receiving the recess-forming doors on the adjacent odd-numbered bead ring segments 18 during the collapse of the drum.

With particular reference to FIG. 2, the recess forming door arrangement is provided by cutting selected end portion sections 96 and 97 of generally parallelogram-like configurations from each odd-numbered bead ring segment. The cut line for each recess forming door extends from a point at each circumferential end of the ring segment substantially intermediate the radial thickness of the ring segment to a location at essentially the same radial plane or level and about one-third through the circumferential length of the bead ring segment. This cut line then extends radially inwardly at a suitable oblique angle substantially complementary to the oblique angle on the outermost ends of the even-numbered ring segments to the radially innermost surface of the bead ring segment and along a line extending toward the radius at the circumferential center of the bead ring segment. An angle of about 55° from the radius is satisfactory for this purpose. The particular configuration of this door-forming cut line is complementary to that of the radially outermost end portion of the adjacent drum and ring segments to be received in the recess 92 defined by the door as will be described in greater detail below. These door sections 96 and 97 are pivotably attached to the bead ring segment so that they can be pivoted radially inwardly about the circumferential and radial center of the bead ring segment to define the recesses 92 therein. The size of the recesses 92 formed by the pivoting of the door sections 96 and 97 is sufficient to receive the end portions of the adjacent even-numbered drum and ring segments when the tire drum is in a fully collapsed state.

A satisfactory hinge or pivot arrangement for these door sections 96 and 97 may be readily provided by attaching one end of metal, tear-drop shaped arms, as shown at 98 and 99, to the respective door sections 96 and 97 by welding or bolting the arms to the door sections. The other end of these arms 98 and 99 is attached to a pivot point provided by a suitable pin or a bolt 100, as shown, which is threadedly attached to the ring segment at essentially, and preferably, the circumferential radial center thereof. The arms 98 and 99 may be of any suitable construction and are preferably provided with spaced apart fingers or projections 102 at the ends thereof disposed about the bolt 100 and contain a bolt receiving bore hole 104 therethrough. These fingers 102 as best shown in FIG. 3 intermesh with one another at the pivot point provided by the bolt 100 to provide for individual pivoting movement of the arms 98 and 99 during the pivoting of the door sections 96 and 97.

To help maintain the door sections 96 and 97 in position within the ring segments when the tire building drum is in its expanded configuration and to also provide some restraint against the doors dropping or falling radially inwardly during the collapse of the drum, a bias mechanism 106 is attached to the arms 98 and 99 for urging the door sections 96 and 97 toward a closed configuration. This bias mechanism 106 is suitably provided by positioning an elongated coil spring 108 radially outwardly from the bolt 100 and attaching each end of the coil spring 108 to the arms 98 and 99 by vertically extending members 110 and 112.

. The smaller ring segments, i.e., the even-numbered ring segments, are alternately disposed between pivotable door-containing ring segments as shown in FIGS. 1 and 2, and are provided with receptacle-forming cavities 94 therein at a location axially inwardly of the tire bead supporting face on the bead ring segments so as to provide the bead ring segment with an unbroken radially extending portion of a suitable thickness to maintain structural integrity during the fabrication of the tire bead assemblies thereon. These cavities 94 are of longitudinal and radial dimensions sufficient to receive adequate portions of the adjacent hinged doors 96 and 97 to enable the drum to be collapsed. These cavities 94 are preferably formed by milling out substantially the entire backside of the even-numbered ring segments.

In order to pivot the hinged doors 96 and 97 out of the way for reception of the radially outermost end portions of the even-numbered ring segments, the doors 96 and 97 are each provided with a circumferentially extending tab or arm 114 disposed at the radially outermost edge of the doors. These tabs 114 project into the cavity or receptacle 94 of the even-numbered ring segments when the drum is in its expanded configuration. During the collapsing of the drum, the radially outermost surface 116 of the even-numbered ring segments which partially define the receptacle 94 contacts the tabs 114 to pivot the doors 96 and 97 radially inwardly and out of the way for the reception of the end portions of the even-numbered ring segments in the recess 92 defined by the pivoted doors. The tab arrangement also aligns the doors 96 and 97 in a suitable radial orientation for reception into the receptacle 94 within the even-numbered bead ring segments. The tabs 114 are preferably provided with an angled radially inwardly extending outer surface 118 so as to aid in the pivoting of the doors 96 and 97. Also, the tabs 114 are preferably provided with a radially inwardly extending body portion 120 which is contactable by a block 122 secured to the receptacle-defining inner surface of the even-numbered bead ring segments at opposite ends thereof when the drum is in its expanded configuration. These blocks 122, by contacting the body portion 120 of the tab, maintain the doors 96 in a closed orientation during the tire carcass building operation.

To keep the doors properly radially aligned when the drum is in an expanded configuration, the doors 96 and 97 are preferably provided with bores 124 in the radially outermost surface thereof for receiving the end of pins 126 which radially inwardly project from bores 127 in the ring segment into the recesses for reception in bores 124 as the doors are closed. This placement of the pins 126 may be readily achieved by extending the bore for the ring-attaching bolts 90 through the ring segment and into the surface of the ring segment provided by the cut line for the door assemblies. The reception of the pins 126 in the bores 124 provide sufficient structural integrity to the door sections 96 and 97 to maintain them in place during tire carcass fabrication.

When the door sections 96 and 97 are pivoted radially inwardly by the adjacent ring segments contacting the tabs 114, the door sections 96 and 97 must be axially oriented so that they can be received in the receptacle 94 behind the face of the even-numbered ring segments. If the door sections were to be pivoted directly radially inwardly they would contact the circumferential ends of the adjacent even-numbered ring segments. To overcome this problem, the door sections 96 and 97 are pivoted at an angle to the perpendicular so that the door sections 96 and 97, in effect, pivot axially inwardly and away from the solid end portions of the adjacent even-numbered ring segments. As best shown in FIG. 3, this angled pivot arrangement for the door sections 96 and 97 is achieved by providing the backside of the odd-numbered ring segments with a depression 128 set at an angle to the perpendicular and then mounting the bolts 100 at an angle perpendicular to the surface of this depression 128. This angle may be of any suitable angle sufficient to assure axial clearance of the swinging doors 96 and 97 from the ends of the adjacent ring segments. For example, a 10° angle has been found to be satisfactory for achieving this goal.

In order to assure that the collapse of the even-numbered drum segments with the ring segments attached thereto can be initiated at a time prior to the collapse of the odd-numbered drum segments and the ring segments thereon, the initial cut line as indicated by line 129 in FIG. 2 between the even- and odd-numbered drum segments and ring segments extends radially inwardly from the bead ring-supporting drum segments to about one-half the radial thickness of the ring segments and is at an oblique angle to the drum radius. This angle at each end of the even-numbered segments converges to a point of intersection disposed radially outwardly from the drum. The remainder of the cut line is at a different angle as will be described below. The oblique cut line angle defining the radially outermost portion of fay surfaces between adjacent ring segments is at an angle sufficiently large to assure that the even-numbered ring segments can be displaced inwardly at a time immediately prior to that of the radial displacement of the odd-numbered segments. The oblique cut line angles on the odd-numbered drum and ring segments are complementary to those on the even-numbered drum and ring segments so as to define a contiguous relationship between the drum segments over the entire ring surface when the drum is expanded. Normally an initial cut angle as best defined by the complementary cut angles on the even-numbered ring segments is at an angle in the range of about 3° to 90°, preferably about 48°, to the radius at the circumferential center of the odd-numbered ring segments. These cut angles are sufficient to assure that the drum and ring segments do not bind or hang up during the radial displacement thereof during collapse or expansion of the drum segments.

To assure that the even-numbered ring segments can be placed in an end-to-end orientation to provide the drum with a fully collapsed configuration, the circumferential length of each segment at the radially innermost edge thereof must be of a length wherein the total length of the segments is not more than that which will permit the ring segments to be placed in an end-to-end orientation. To provide the even-numbered segments with a sufficiently small inner length to fit end-to-end when the drum is in a collapsed state, the oblique angle of the innermost cut line between the ring segments is provided at a shallower angle starting at approximately the radial midpoint of the ring segment and extending to the radially innermost surface of the ring segment as generally shown by line 130. The particular angle selected for the cut line 130 depends upon the particular length of the even-numbered drum segments and the extent of drum collapsed required. For example, in a typical arrangement with ten drum segments providing a drum diameter of 32 inches that is to be collapsed to a diameter of 18 inches and with the drum supporting the foldable bead rings 68 and 70 as described herein, the five even-numbered ring segments must each have an inner length of less than 5 inches. To provide each ring segment with this length, the cut line 130 is provided at an angle of about 35° on the complementary odd-numbered ring segments to the central radius thereof. Also, it may be desirable to provide a small notch 132 at the circumferential ends or tips of the even-numbered ring segments at the innermost surface thereof to further assure that the combined length of these even-numbered ring segments is such than that ring segments will fit end-to-end with the drum in the collapsed state.

As the ring segments are radially inwardly collapsed during the collapse of the drum, the ring segments circumferentially close upon one another to, in effect, move the end portions of the even-numbered ring segments into the recesses 92 provided by the pivoting of the door sections 96 and 97 while simultaneously moving the pivoted door sections 96 and 97 into the receptacles 94 provided in the even-numbered ring segments. This circumferential movement of the ring segments is in the opposite direction as the drum is expanded to the full drum configuration so that the end portions and the door sections are withdrawn from their respective recesses and receptacles during the expansion of the drum into the expanded configuration.

To provide a more facile understanding of the present invention, typical drum collapsing and drum expansion operations are described below. Upon completion of the building of a tire carcass, preferably with a plurality of tire reinforcing beads axially bearing against the innermost ends of the bead rings 68 and 70, the drum is collapsed in order to remove the assembled tire carcass from the drum. To affect this collapsing of the drum, the disk brake 62 is engaged to stop the quill 60 and sleeve 48 from rotating while the shaft 14 is rotating the drum in a first direction. This rotation of the drum with respect to the sleeve 48 causes the swing arms 50 and 52 to pivot at the sleeve 48 and move the drum and ring segments radially inwardly. As briefly described above, the collapse of the even-numbered drum and ring segments is initiated immediately prior to the collapse of the odd-numbered drum and ring segments. This initial movement of the even-numbered ring segments permits the inner surface 116 of the even-numbered rings to contact the tabs 114 on the door sections 96 and 97 to pivot the doors 96 and 97 radially inwardly and slightly axially outwardly. During the radial collapse of the drum segments and the ring segments attached thereto, the adjacently disposed ring segments circumferentially close upon one another so that as the even-numbered ring segments are displaced radially inwardly, the outermost circumferentially end portions thereof enter the recesses 92 formed by the pivoting of the door sections 96 and 97. Simultaneously, with the movement of these end portions into the recesses 92, the pivoted door sections 96 and 97 are moved into the receptacle 94 in the even-numbered ring segments. This circumferential closing and the folding of the ring segments continues as the drum is being collapsed so that when the drum is adequately collapsed the ends of the even-numbered drum segments are essentially in a touching end-to-end relationship about the circumference of the drum while the outermost odd-numbered drum segments are in a near touching relationship with one another at a location radially outwardly from the even-numbered drum segments, as shown in FIG. 7.

In the drum expansion mode as required for providing a cylindrical drum for tire carcass building operations, the rotation of quill 60 and the sleeve 48 is again stopped while the shaft 14 rotates the drum in the direction opposite to that required for collapsing the drum. This relative movement of the drum to the sleeve causes the swing arms 50 and 52 to again pivot, but in the opposite direction to radially expand the drum segments and the tire bead ring segments attached thereto to the expanded drum configuration. This movement or radial expansion of the drum segments is such that the odd-numbered drum segments are displaced radially outwardly immediately ahead of the even-numbered drum segments so that when the even-numbered drum segments approach the final diameter the oblique angles at the ends thereof facilitate the insertion of the even-numbered drum and ring segments into the final drum configuration. During this radial expansion, the end portions on the even-numbered ring segments and the hinged door sections 96 and 97 circumferentially retract from the recesses 92 and the receptacles 94 so that as the drum is expanded to its final configuration the end portions and the door sections are fully withdrawn.

It will be seen that the present invention provides a significant improvement over the drum assemblies previously utilized to manufacture high profile, multiple bead tires. The substantial increase in safety as well as substantial reductions in maintenance, operator time, and overall cost provided by the present invention are of a significant value to the tire building industry. Also, while the present invention is described as being used with a particular collapsible drum assembly, it will appear clear that the foldable bead ring assembly of the present invention may be utilized on other radially collapsible drums having a different number of drum segments or on drums using different drum collapsing mechanisms as long as the sequence of drum segment collapse and expansion is such that the sequence of the door pivoting and the movement of the various drum and ring components into the adjacent receptacles and recesses may be properly obtained.

What is claimed is:

1. A collapsible tire building drum comprising segmented sleeve means rotatable about an axis of rotation, an elongated cylindrical drum means circumferentially disposed about said sleeve means and comprising a plurality of elongated axially extending drum segments, collapsible means coupled to each of said drum segments and to said sleeve means for collapsing said drum segments toward said axis or expanding said drum segments away from said axis to define the cylindrical drum means, and bead seating ring means supported by opposite longitudinal ends of said drum segments and projecting radially inwardly from the drum segments toward said axis, said ring means each comprising a plurality of curved ring segments disposed in a contiguous end-to-end relationship to one another and with at least one ring segment having an end portion thereof pivotably attached thereto for defining recess means therein of a size sufficient for receiving an outer end portion of a drum segment and its supported ring segment disposed adjacent to said at least one ring segment during the collapsing of said drum segments toward said axis, said supported ring segment having receptacle means therein for receiving the pivotably attached end portion of said at least one ring segment during the collapsing of said drum segments towards said axis.

2. The collapsible tire building drum as claimed in claim 1, wherein tab means is attached to each of the pivotably attached end portions and extends into said receptacle means in the adjacent ring segment, wherein said at least one ring segment comprises a plurality of spaced apart ring segments, wherein there is a plurality of said supported ring segments each disposed intermediate alternately disposed ring segments defined by said spaced apart ring segments, and wherein each said tab means is contactable by a surface on the outer end portions of each ring segment disposed intermediate said alternately disposed ring segments for pivoting the pivotably attached end portions thereof radially inwardly to define said recess means during the collapsing of the drum segments supporting the ring segments disposed intermediate said alternately disposed ring segments towards said axis.

3. The collapsible tire building drum as claimed in claim 2, wherein each said pivotably attached end portion is of a circumferential length extending from a circumferential end of each said alternately disposed ring segments to a location adjacent to but circumferentially spaced from the circumferential center of each alternately disposed ring segment, and wherein each pivotably attached end portion extends between the radially innermost surface of each alternately disposed ring segment and a level thereon corresponding to about one-half the radial thickness thereof.

4. The collapsible tire building drum as claimed in claim 3, wherein each said receptacle means is disposed at a location axially spaced from a radially oriented portion of each said ring segment disposed intermediate said alternately disposed ring segments and radially inwardly from an axially extending outer portion of each said ring segment disposed intermediate said alternately disposed ring segments, wherein each said receptacle means is partially defined by an inner surface of said radially oriented portion and by an inner surface of said axially extending outer portion, and wherein each said receptacle means is of a size sufficient to receive a pivotably attached end portion from the adjacent alternately disposed ring segment during collapsing of the drum segments towards said axis.

5. The collapsible tire building drum as claimed in claim 4, wherein elongated arm means are attached at one end thereof to each of said pivotably attached end portions, and wherein an end of the elongated arm means opposite said one end of each said elongated arm means is pivotably attached to each alternately disposed ring segment at substantially said circumferential center thereof for providing a pivot point for each of said pivotably attached end portions.

6. The collapsible tire building drum as claimed in claim 5, wherein substantially axially extending elongated means provide the attachment of each said opposite end of each said elongated arm means to each alternately disposed ring segments, wherein said substantially axially extending elongated means and said elongated arm means are located on a substantially radially oriented inner surface of each alternately disposed ring segment, and wherein said substantially axially extending elongated means are attached to each alternate ring segment at a location substantially intermediate the radially outermost and the radially innermost surfaces thereof.

7. The collapsible tire building drum as claimed in claim 6, wherein each said substantially axially oriented elongated means is canted at an angle to said axis sufficient to effect the pivoting of each pivotably attached end portion in a plane axially inwardly from said inner surface of each said radially oriented portion for reception of each pivotably attached end portion in each said receptacle means.

8. The collapsible tire building drum as claimed in claim 4, wherein bias means are in registry with each of the pivotably attached end portions for urging the latter radially outwardly from said axis.

9. The collapsible tire building drum as claimed in claim 8, wherein said bias means comprises an elongated coil spring disposed at a location radially outwardly from said substantially axially oriented elongated means, and wherein opposite ends of said spring are attached one to each of said elongated arm means at a location intermediate the ends thereof.

10. The collapsible tire building drum as claimed in claim 7, wherein said substantially axially oriented elongated means comprises a bolt threadedly attached to each said alternately disposed ring segment.

11. The collapsible tire building drum as claimed in claim 4, wherein said collapsible means initiate the collapsing of the drum segments attached to the ring segments disposed intermediate said alternately disposed ring segments towards said axis prior to the collapsing of said drum segments attached to the alternately disposed ring segments for positioning the ring segments disposed intermediate the alternately disposed ring segments at a location radially inwardly from the alternately disposed ring segments during the collapsing of said drum segments towards said axis.

12. The collapsible tire building drum as claimed in claim 11, wherein said ring segments disposed intermediate the alternately disposed ring segments are each of a circumferential length at the radially innermost end thereof sufficient to provide for the positioning of said ring segments disposed intermediate the alternately disposed ring segments in a contiguous end-to-end relationship when said drum segments are collapsed radially inwardly.

13. The collapsible tire building drum as claimed in claim 12, wherein the radially outermost end of the ring segments disposed intermediate said alternately disposed ring segments and the drum segments attached to the intermediate ring segments are of a circumferential length less than the circumferential length of the radially outermost end of the alternately disposed ring segments and the drum segments attached thereto.

14. The collapsible tire building drum as claimed in claim 13, wherein the fay surfaces between said alternately disposed ring segments and the ring segments disposed intermediate the alternately disposed ring segments are oriented along oblique angles, and wherein the oblique angles at opposite ends of said ring segments disposed intermediate the alternately disposed ring segments are complementary to the oblique angles at the opposite ends of adjacent alternately disposed ring segments and have a point of intersection located radially outwardly from said drum segments.

15. The collapsible tire building drum as claimed in claim 15, wherein each of said fay surfaces are oriented along two oblique angles, wherein the two angles at each fay surface intersect at substantially the radial center of the ring segments, and wherein the radially innermost oblique angles have a point of intersection located radially outwardly from a point of intersection of the radially outermost oblique angles.

16. The collapsible tire building drum as claimed in claim 2, wherein radially and axially extending block means are disposed in said receptacle means adjacent to a radially innermost surface thereof for contacting said tab means prior to the collapsing of said drum segments.

17. The collapsible tire building drum as claimed in claim 2, wherein radially oriented pin means extend between and engage each of said pivotably attached end portions and a portion of the alternately disposed ring segment located radially outwardly from each pivotably attached end portion for maintaining the axial position of each said pivotably attached end portion prior to the collapsing of said drum segments.

18. The collapsible tire building drum as claimed in claim 3, wherein said level is substantially uniformly radially spaced from said axis over substantially the full circumferential length of each pivotably attached end portion, wherein said level of each said pivotably attached end portion is connected to said radially innermost surface at an oblique angle, and wherein the oblique angles on the pivotably attached end portions are complementary to angles on said outer end portions and have a point of intersection located radially inwardly from said circumferential center of each alternately disposed ring segment.

* * * * *

UNITED STATES PATENT AND TRADEMARK OFFICE
CERTIFICATE OF CORRECTION

PATENT NO. : 5,047,108
DATED : September 10, 1991
INVENTOR(S) : Mark S. Byerley It is certified that error appears in the above-identified patent and that said Letters Patent is hereby corrected as shown below:

Column 14, line 6, Claim 15

Delete "claim 15" and insert --claim 14-- therefor.

Signed and Sealed this

Twelfth Day of January, 1993

*Attest:*

DOUGLAS B. COMER

*Attesting Officer*      Acting Commissioner of Patents and Trademarks